US006259685B1

(12) United States Patent
Rinne et al.

(10) Patent No.: US 6,259,685 B1
(45) Date of Patent: Jul. 10, 2001

(54) METHOD FOR CHANNEL ALLOCATION UTILIZING POWER RESTRICTIONS

(75) Inventors: Mika Rinne, Espoo; Mikko Rinne; Oscar Salonaho, both of Helsinki, all of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/390,529

(22) Filed: Sep. 3, 1999

Related U.S. Application Data

(63) Continuation of application No. PCT/FI98/00255, filed on Mar. 23, 1998.

(30) Foreign Application Priority Data

Mar. 27, 1997 (FI) .................................................. 971328

(51) Int. Cl.[7] .......................... H04Q 7/00; H04Q 7/20; H04B 7/212
(52) U.S. Cl. ..................... 370/330; 370/348; 455/450
(58) Field of Search .................................. 370/321, 322, 370/326, 345, 347, 348, 328, 329, 330, 436, 335, 342; 455/450, 451, 452, 454

(56) References Cited

U.S. PATENT DOCUMENTS

| 5,210,771 | * | 5/1993 | Schaeffer et al. ............... 375/132 |
| 5,295,153 | * | 3/1994 | Gudmundson ................... 370/335 |
| 5,301,188 | * | 4/1994 | Kotzin et al. ................... 370/330 |
| 5,579,306 | * | 11/1996 | Dent ................................ 370/330 |
| 5,594,720 | * | 1/1997 | Papadopoulos et al. ......... 370/330 |

FOREIGN PATENT DOCUMENTS

| 0 295 227 | 12/1988 | (EP) . |
| 2 266 433 | 10/1993 | (GB) . |
| WO 95/17048 | 6/1995 | (WO) . |

OTHER PUBLICATIONS

IEEE Transactions on Vehicular Technology, vol. 43, No. 1, Feb. 1994, Wong et al., A Transmit Power Control Scheme for Improving Performance in a Mobile Packet Radio System:, pp. 174–180.

IEEE Personal Communications, Jun. 1996, Katzela et al., "Channel Assignment Schemes for Cellular Mobile Telecommunication Systems: A Comprehensive Survey", pp. 10–31.

\* cited by examiner

*Primary Examiner*—Huy D. Vu
*Assistant Examiner*—Kevin C. Harper
(74) *Attorney, Agent, or Firm*—Altera Law Group, LLC

(57) ABSTRACT

In channel allocation, the objective is to allocate channels to desired connections using the available frequency spectrum as effectively as possible so that the connections will not cause excessive interference to each other. This invention presents a method based on time blocking of transmission in connections using different transmission powers, in order further to improve the allocation of channels.

22 Claims, 14 Drawing Sheets

2

METHOD FOR CHANNEL ALLOCATION UTILIZING POWER RESTRICTIONS

This application is a continuation of PCT/FI98/00255 filed Mar. 23, 1998.

FIELD OF THE INVENTION

This invention relates to the allocation of channels of a cellular radio network in systems using channels having a time frame structure.

BACKGROUND OF THE INVENTION

In mobile communications systems, mobile stations and base transceiver stations may set up connections through channels of a so-called radio interface. A certain frequency area is always allocated for use by the system. To have sufficient capacity in the mobile communications system on this limited frequency band, the channels which are in use must be used several times. For this reason, the coverage area of the system is divided into cells formed by the radio coverage areas of individual base transceiver stations, which is why the systems are often also called cellular radio systems.

FIG. 1 shows the main structural features of a known mobile communications system. The network comprises several inter-connected MSCs (Mobile Services Switching Centre). The mobile services switching centre MSC can set up connections with other mobile services switching centres MSC or with other telecommunication networks, e.g. ISDN (Integrated Services Digital Network), PSTN (Public Switched Telephone Network), Internet, PDN (Packet Data Network), ATM (Asynchronous Transfer Mode) or GPRS (General Packet Radio Service). Several base station controllers BSC are connected to the mobile services switching centre MSC. Base transceiver stations BTS are connected to each base station controller. The base transceiver station may set up connections with mobile stations MS. A network management system NMS may be used for collecting information from the network and for changing the programming of network elements.

The air interface between base transceiver stations and mobile stations can be divided into channels in several different ways. Known methods are at least TDM (Time Division Multiplexing), FDM (Frequency Division Multiplexing) and CDM (Code Division Multiplexing). The band available in a TDM system is divided into successive time slots. A certain number of successive time slots forms a periodically repeating time frame. The channel is defined by the time slot used in the time frame. In FDM systems, the channel is defined by the used frequency, while in CDM systems it is defined by the used frequency hopping pattern or hash code. Combinations of the division methods mentioned above can also be used.

FIG. 2 shows an example of a known FDM/TDM division. In the figure, frequency is on the vertical axis while time is on the horizontal axis. The available frequency spectrum is divided into six frequencies F1–F6. In addition, the frequency channel formed by each frequency is divided into repeating time frames formed by 16 successive time slots. The channel is always defined by the couple (F, TS) of frequency F and time slot TS used in the time frame.

In order to maximize capacity, channels must be reused in cells which are as close to one another as possible. Reuse of channels is limited by the interference caused to one another by the connections in the network.

FIG. 3 shows the emergence of interference caused to each other by simultaneous connections. In the figure three mobile stations MS1, MS2 and MS3 communicate with base transceiver stations BTS1, BTS2 and BTS3. The signal received by base transceiver station BTS1 contains a signal S1, which is sent by mobile station MS1 and which is showed by a solid line and the power of which depends on the transmission power used by mobile station MS1 and on fades on the radio path between mobile station MS1 and base transceiver station BTS1. Typically, the radio path fading is smaller with a shorter distance between base transceiver station and mobile station. In addition to signal S1, the signal received by the base transceiver station contains signal components I21 and I31 caused by signals sent by mobile stations MS2 and MS3. Components I21 and I31 will cause interference in the reception, if they are not filtered away from the signal received by the base transceiver station. Correspondingly, the signal sent by mobile station MS1 causes signal components I12 and I13 in the signals received by base transceiver stations BTS2 and BTS3 and these signal components may cause interference in the receptions. Components of a similar kind also emerge in the signals received by mobile stations from base transceiver stations.

If signal components I21 and I31 are on the same channel as signal S1, they can not be removed by filtering. Interference may also be caused by signals occurring on other channels than on the same channel. E.g. in systems using FDM frequency division, channels which are adjacent to one another on the frequency level are always slightly overlapping in order to use the frequency spectrum as effectively as possible, which will result in reception interference also from signals which are on the adjacent channel. Correspondingly, when using code division CDM, connections using codes that are too much alike will cause interference to one another. However, so-called neighbor channel interference caused by signals on other channels is considerably smaller than the interference caused by equally powerful signals on the same channel. The interference may also be affected e.g. by using frequency or time slot hopping. In frequency hopping, the frequency used by the connection is frequently changed, whereby the interference caused to one another by connections will be averaged. In time slot hopping again the time slot used in the connection is frequently changed. When using frequency or time slot hopping, the individual connection will not suffer an interference which is considerably worse than for others, but all connections will suffer interference of the same level.

The magnitude of interference caused by connections to each other thus depends on the channels used by the connections, on the geographical location of connections and on the transmission power used. These may be influenced through a systematic allocation of channels to different cells and through transmission power control taking the interference into account.

It is an objective in channel allocation to allocate such channels to the desired connections which may all be used at the same time while the signal quality remains acceptable. The invention to be presented in this application relates to but is not limited to fixed channel allocation FCA, wherein the required number of channels is allocated in advance to each cell with the aid of so-called frequency planning. In frequency planning it is ensured that the connections operating on channels allocated in different cells will not interfere excessively with each other. For interference control, the base transceiver station in each cell is given a maximum limit for the allowed transmission power. The distance at which one and the same channel can be reused so that the CIR (C/I, Carrier to Interference Ratio) remains acceptable, is called the interference distance while the distance at which one and the same channel is reused is called the reuse distance.

The same frequencies are reused according to a so-called reuse pattern. When using a channel structure with FDM/ TDM division, typical reuse pattern sizes are 7, 9 and 12 cells, in other words, such patterns where the same frequencies are reused in every ninth or in every $12^{th}$ cell. FIG. 4 shows an example of a reuse pattern the size of which is 9 cells. In FIG. 4 the frequencies are divided into 9 classes 1–9. One frequency class shown beside the cell in the figure is allocated for use by each cell. Only those channels may be used in the cell which belong to the frequency class allocated for use by the cell.

The reuse pattern can be made denser e.g. by using directed antennas or by reducing the demand made on the CIR ratio of the FDM/TDM signal. The carrier to interference ratio CIR demanded of the network can be lowered e.g. by improving the spectrum characteristics of the signal by using frequency hopping or a hash code of the CDM type or by using a more effective channel coding.

Other channel allocation methods besides FCA are at least DCA (Dynamic Channel Allocation) and HCA (Hybrid Channel Allocation) which is obtained as a combination of FCA and DCA. The different methods are described very thoroughly in the publication I. Katzela and M. Naghshineh: "Channel Assignment Schemes for Cellular Mobile Telecommunication Systems: A Comprehensive Survey", IEEE Personal Communications, pp. 10–31,June 1996.

Traffic is divided in such a way in the cell that some mobile stations are near the base transceiver station. Signals in the connections between these mobile stations and the base transceiver station typically experience considerably less fades than signals transmitted between the base transceiver station and mobile stations which are far from the base transceiver station. Channels used for connections between these mobile stations and the base transceiver station could be better reused than channels used by mobile stations located far from the base transceiver station and suffering greater fades in their connections. In fact, several overlapping reuse patterns can be used in a cellular radio network. Such a channel allocation method is called RUP (ReUse Partitioning). The channels are hereby divided into channel pools corresponding to different reuse patterns. Connections with low attenuation (typically connections between the base transceiver station and mobile stations located near it) which thus tolerate a higher interference level and cause less interference to other connections are directed to use a dense reuse pattern.

Using a carrier to interference ratio CIR which is higher than necessary will hardly improve the connection quality in digital systems but will just unnecessarily increase the interference caused to other connections. It is therefore sensible to control dynamically the transmission power used by the connections. A dynamic control of the transmission power aims at maintaining an adequate connection quality, however, at the same time minimizing the transmission power used. Besides the capacity advantages obtainable by minimizing the interference level, a considerable cut in the mobile station's power consumption is achieved through transmission power control.

The required power depends on fades on the channel between mobile station and base transceiver station, on interference caused by other connections and on ambient noise. On the one hand, by increasing the transmission power of the first connection it is possible to improve the carrier to interference ratio CIR of the connection, but on the other hand, extra interference will then be caused to other connections located nearby. The quality of other connections will hereby suffer. In response to increased interference and impaired quality, the other connections will raise their own transmission power, which will cause additional interference to the first connection. The situation is illustrated in FIG. 5.

The power control of three mutually interfering connections is examined in FIG. 5. The signal transmission power P1 of connection 1 is adjusted by the power controller PC1 so that the quality of the signal which is detected by the recipient and which mainly depends on the carrier to interference ratio CIR remains acceptable. The signal power C1 detected by the recipient of the signal depends on transmission power P1 and on the attenuation caused to the signal by the radio channel between sender and recipient. The attenuation is typically reduced with a shorter distance between mobile station and base transceiver station. Interference is caused to the received signal by ambient noise N1 and by interference I1 caused by the transmitters of other connections. Interference I1 depends on attenuation on the radio path between interfering transmitters and the recipient and on transmission powers P2 and P3 of the transmitters. The total signal S1 detected by the receiver is formed of the sum of signal C1, interference I1 and noise N1. If the information sent in signal C1 can not be adequately reconstructed from the received signal S1, then power controller PC1 will raise the signal transmission power P1. Correspondingly, if power P1 can be decreased so that the sent information can still be adequately reconstructed, then the power controller will reduce the transmission power P1. Power controllers PC2 and PC3 operate on the same principle. Only those mobile stations which experience little fading on the radio path and which are typically located near their base transceiver station need less transmission power and they cause less interference to others than do those mobile stations which experience more fades and which are typically located far away from the base transceiver station.

Interference can be reduced not only through systematic channel allocation and power control, but also by using directed antennas, whereby the same signal level can be achieved in the receiver with a lower transmission power.

The connection quality is affected not only by the carrier to interference ratio CIR indicating the quality of the radio channel, but also by the sensitivity to errors generated at radio channel of the information signal transmitted on the channel. The information can be made better to tolerate transfer errors by processing it with channel coding and interleaving before sending it to the transmission channel and by using retransmission of faulty data frames.

The purpose of channel coding is both to make the information transfer better tolerate transfer errors and to detect transfer errors. In channel coding such redundancy is added before transmission to the user data which can be used at the signal reception end for remedying errors caused by the radio channel and for detecting such errors which can not be remedied. Channel coding improves the interference tolerance, but on the other hand, it increases the band width necessary for information transfer.

Bit errors occurring on the radio path are typically error bursts having a length of several bit cycles. It is always easier to correct individual bit errors than a series of several successive faulty bits. The probability of occurrence of several successive faulty bits can be significantly reduced through bit interleaving, where the order of bits is mixed in a predetermined manner before sending the signal on the radio path. When the order between bits is restored to the original order at the reception end, those bits where errors have been caused by a burst-like interference on the radio path are no longer adjacent to one another, whereby the errors can be detected and corrected more easily. Interleaving makes more effective the correcting and detection of errors, but on the other hand it will cause some additional delay in the data transfer.

In digital mobile communications systems, information is always sent in frame shape, and if a data frame is found faulty, it can be retransmitted in systems supporting retransmission. By using more powerful channel coding and by retransmission it is possible to forward user data to the recipient with sufficient faultlessness even over a poorer radio channel. The use of retransmission will of course add to the delay in information transfer.

As the number of mobile station subscribers is increasing and those applications, such as multimedia applications, which demand a large band width become more general, state-of-the-art methods of channel allocation are no longer effective enough. It is an objective of the present invention to alleviate this problem by making channel allocation even more effective. This objective is achieved with the method described in the independent claims.

BRIEF DESCRIPTION OF THE INVENTION

The idea of the invention is to optimize the network interference level by blocking in relation to time the transmission powers to be used. Based on the network load, a limitation of the transmission power is determined on a time slot basis for each frequency in the cell. Connections between base transceiver stations and mobile stations are allocated in the time slots according to the transmission powers required in the connections. The transmission power limitation of different time slots can be changed dynamically according to the network load.

In a first embodiment of the invention the frequencies are first divided according to a normal fixed channel allocation of the cells on a relatively dense reuse pattern. Cells using the same frequency are divided into classes. The use of power is blocked between classes in such a way that connections using a high power will not transmit simultaneously. The blocking can be done by establishing for each time slot a limitation of the transmission power to be used. The change of the upper limits of transmission powers can advantageously be done through a negotiation between the network elements controlling channel allocation and power control.

In a second embodiment of the invention, the RUP procedure is used for forming in the network several superimposed repetition patterns of different sizes, for each of which a limitation value is determined for the transmission power. The time slots are divided between the different repetition patterns. The connections to be set up are classified according to the transmission power. The lower transmission power a connection uses, the denser is the repetition pattern used by the time slot to which the connection is directed. Connections using a high transmission power in different cells will transmit simultaneously during the first time slots on a broad frequency reuse pattern. Connections using a low transmission power will also transmit at the same time during other time slots, but on a denser reuse pattern. The time slots are divided between the different repetition patterns according to traffic requirements. It is advantageous to agree on the division through a negotiation between those network elements which attend to channel allocation and power control.

A third embodiment of the invention is a combination of the first end second embodiments. In this embodiment, the connections are first divided roughly according to transmission power into classes, for each one of which a separate frequency reuse pattern is used. Inside the classes the connections are arranged in every cell according to the transmission power, and the time slots of connections are allocated so that inside the class the highest transmission powers will not be used simultaneously in cells located close to each other.

LIST OF FIGURES

The invention will now be described in greater detail referring to the appended drawings, wherein FIG. 1 shows an example of the structure of a mobile communications network;

DETAILED DESCRIPTION OF THE INVENTION

Figure 1:
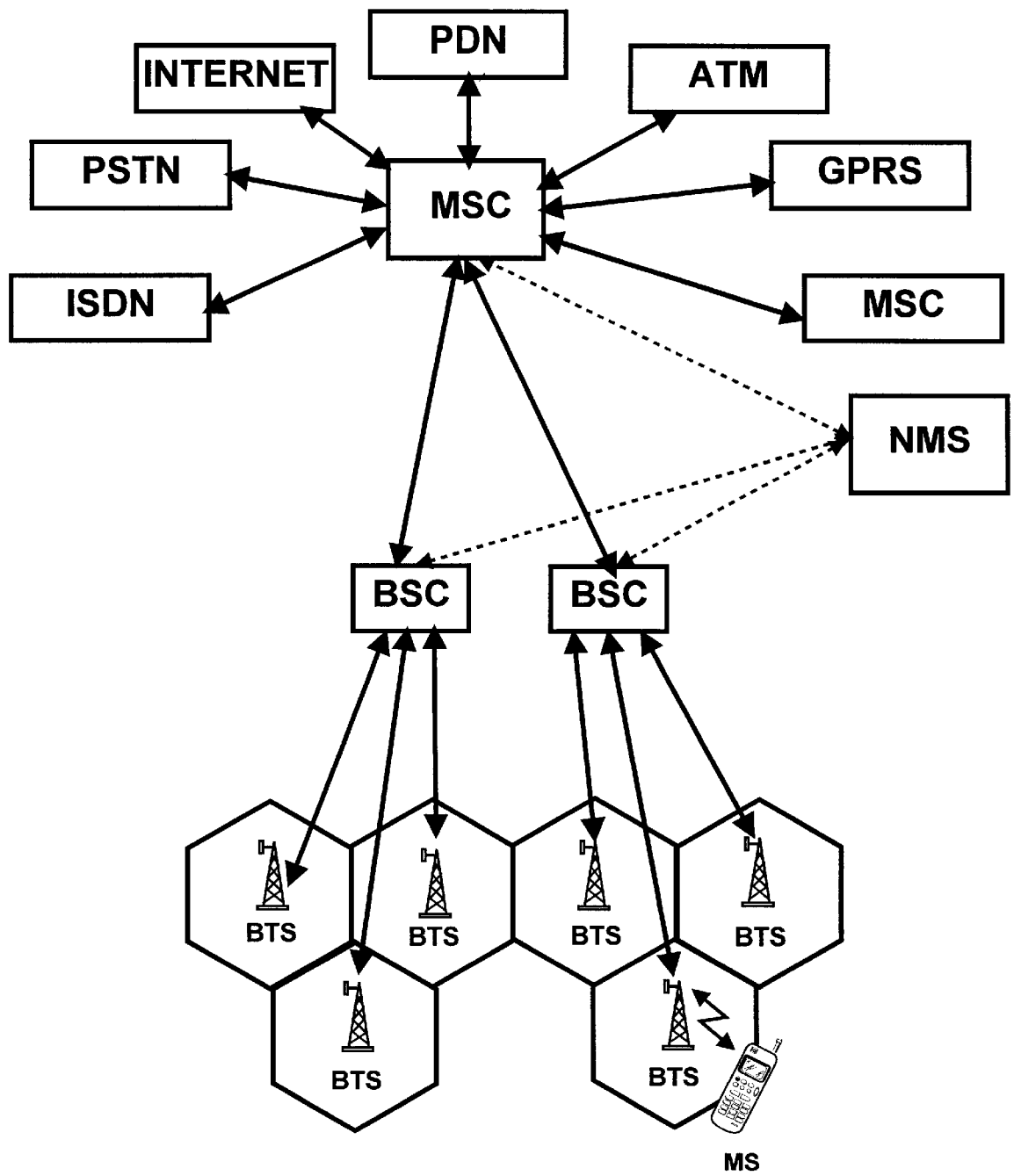
Figure 2:
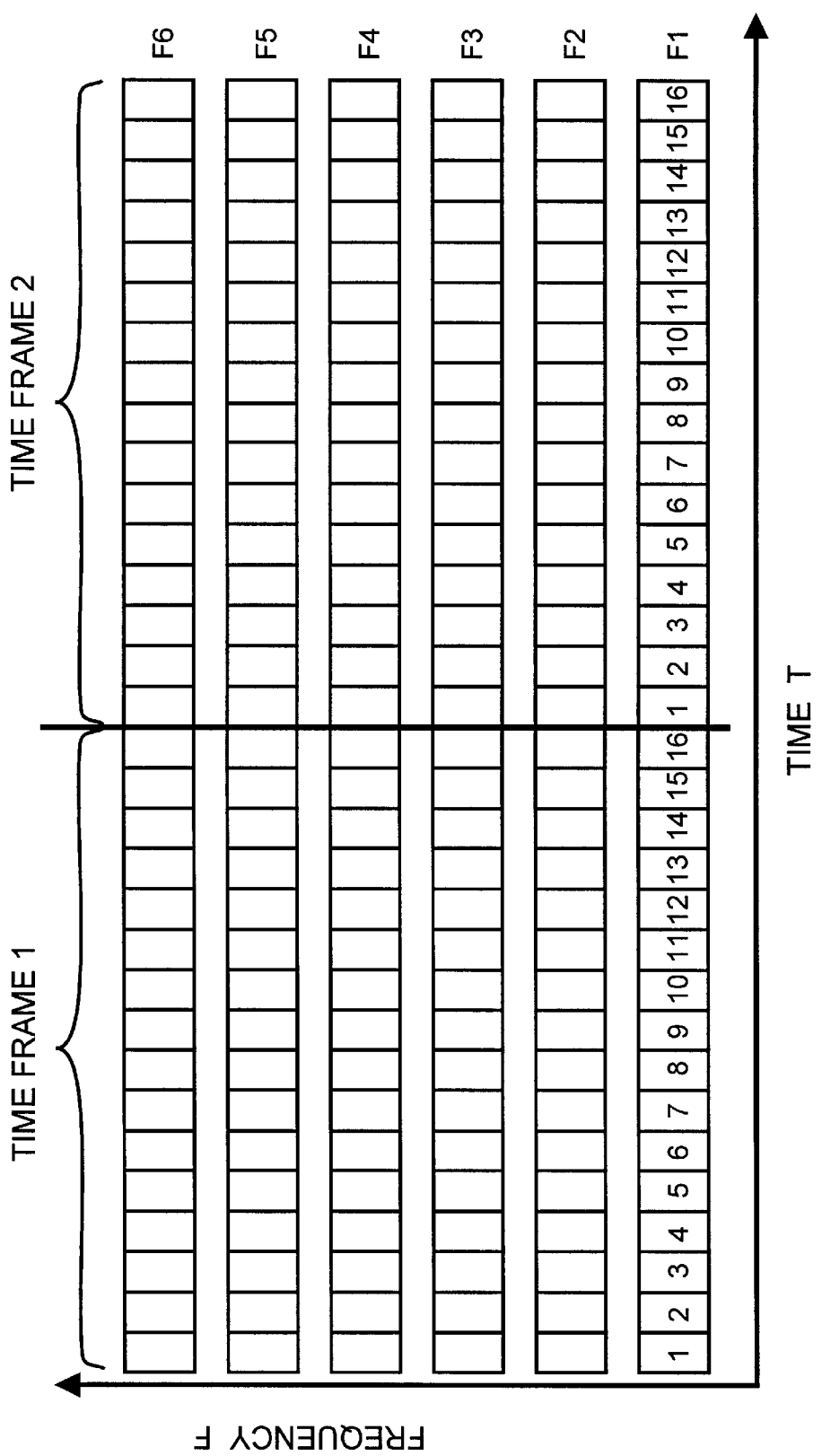
FIG. 2 shows an example of the division of a frequency spectrum into channels.
Figure 3:
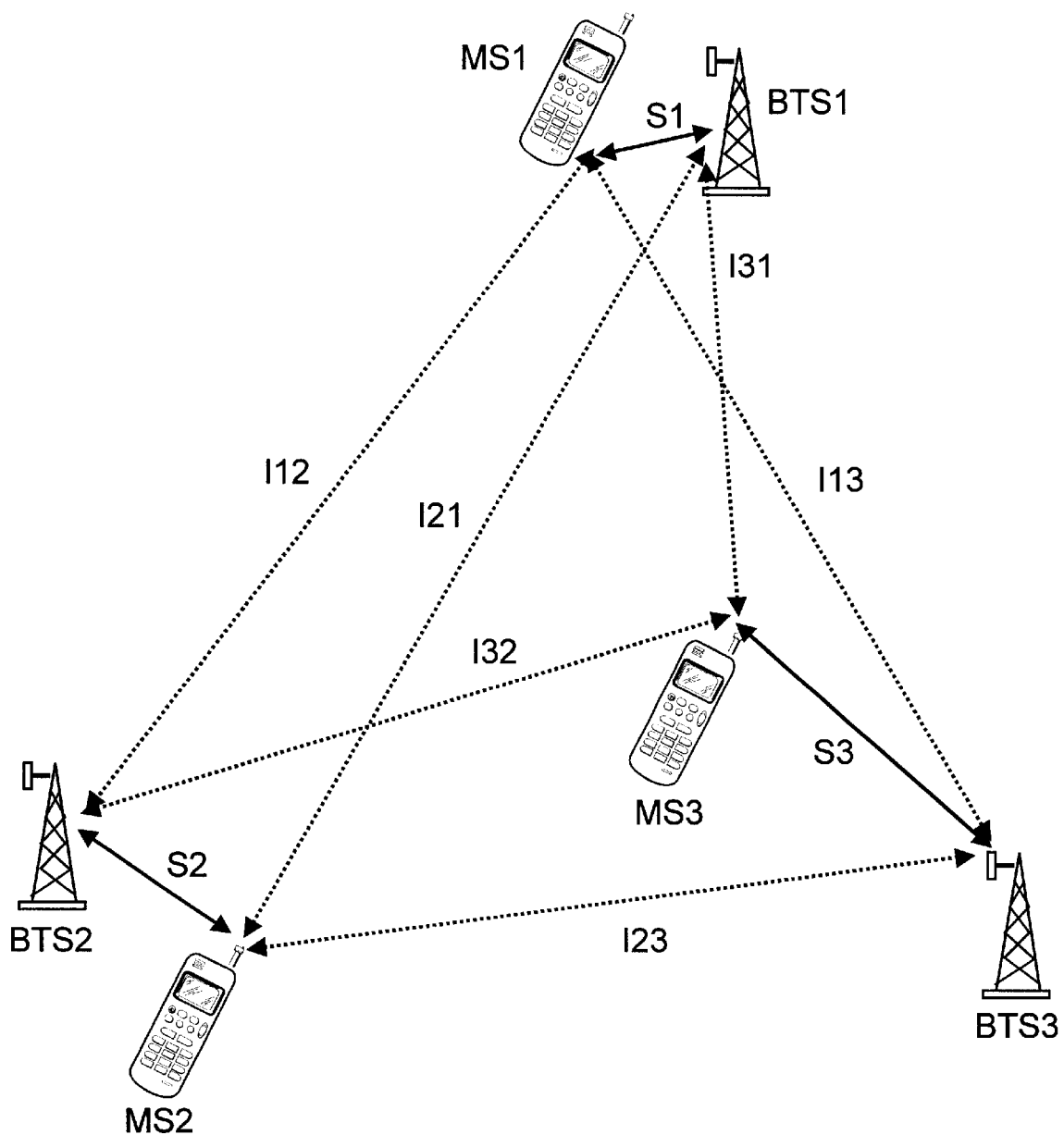
FIG. 3 shows the formation of interference in a mobile communications system.
Figure 4:
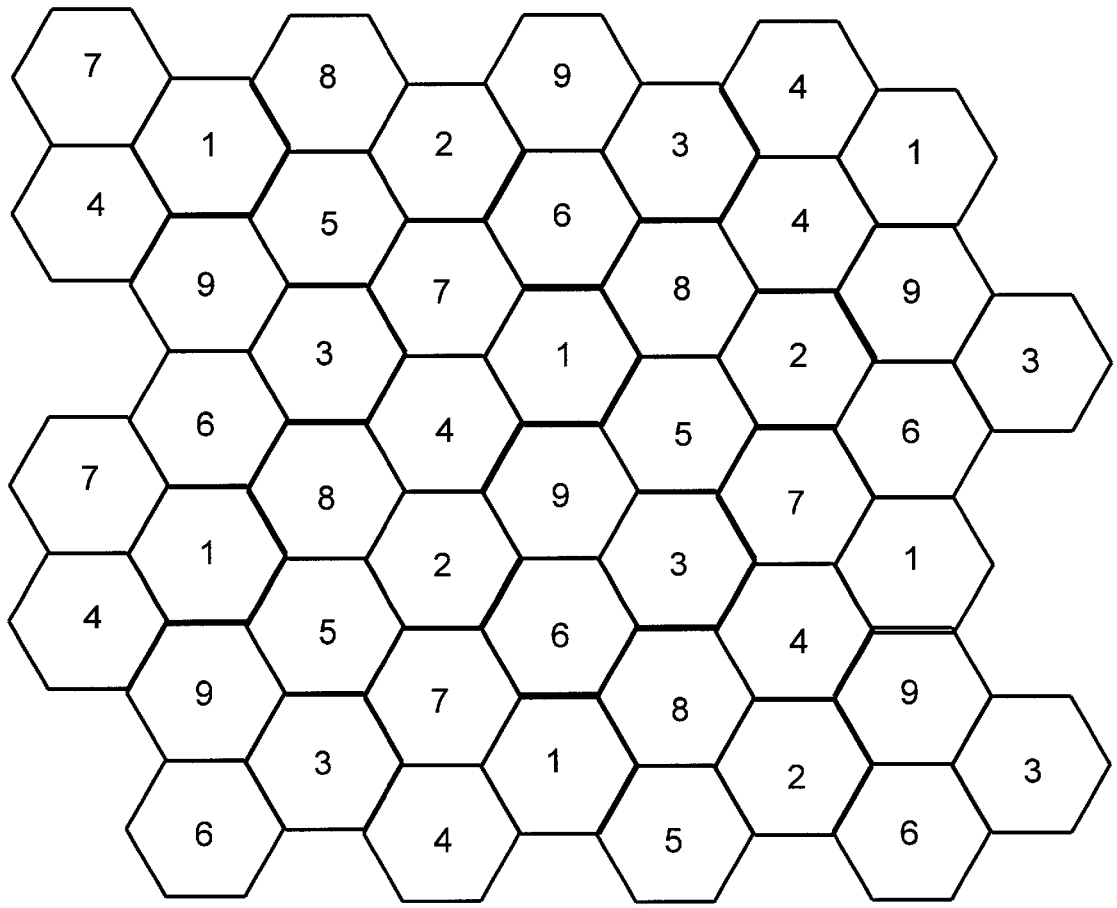
FIG. 4 shows a frequency reuse pattern.
Figure 5:
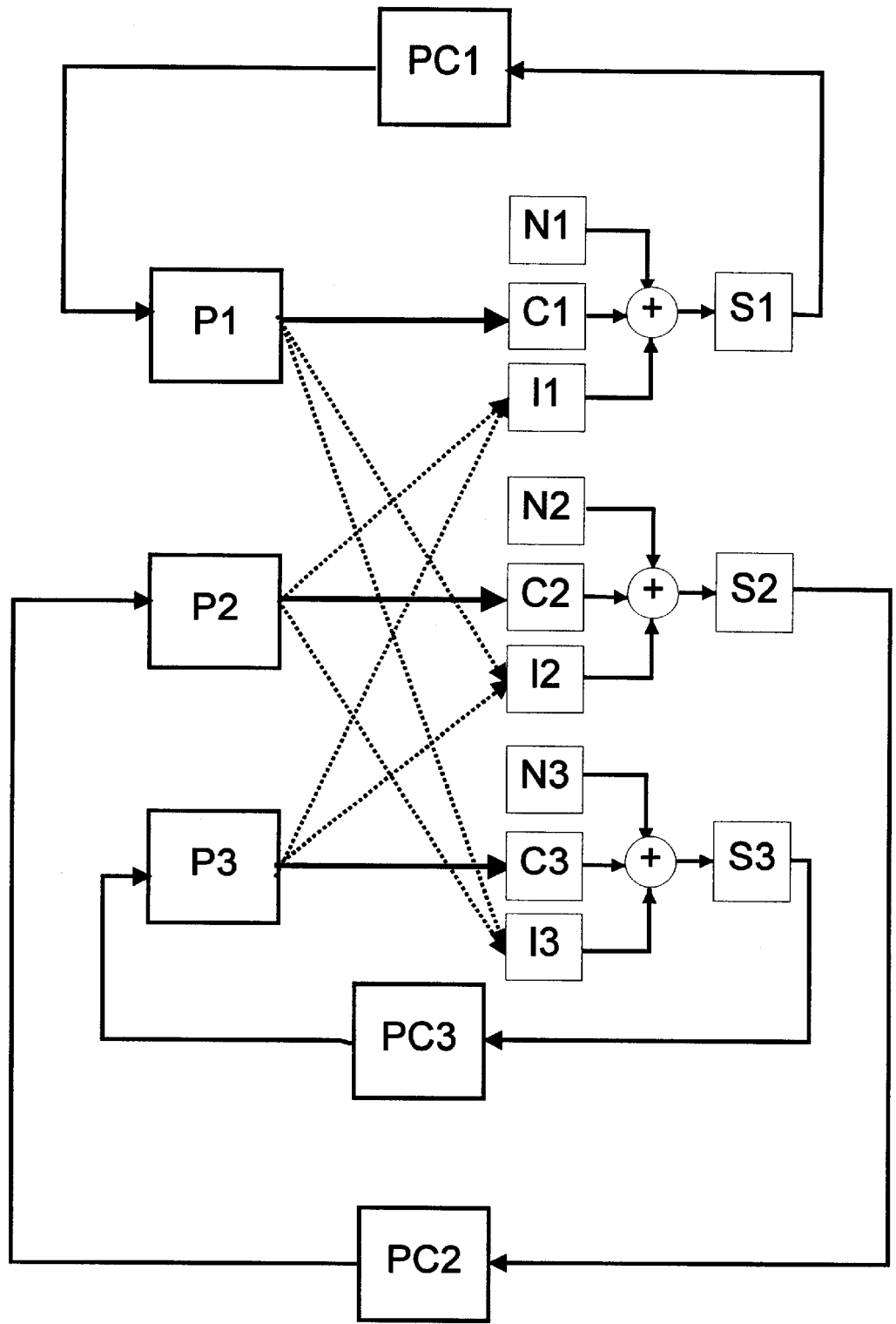
FIG. 5 shows transmission power control.

In channel allocation the objective is to bring about on a limited frequency band a signal level of adequate quality for as many connections as possible. This invention presents solutions which make the allocation of channels more effective by blocking the transmission power. The following is a detailed description of an application of the invention in a FDD/TDD system according to FIG. 2.

In the present invention, connections are arranged according to their power requirement. According to the power requirement, time slots are allocated for use by the arranged connections in a blocked manner in different cells so that interference is minimized between the connections to be set up.

Figure 6:
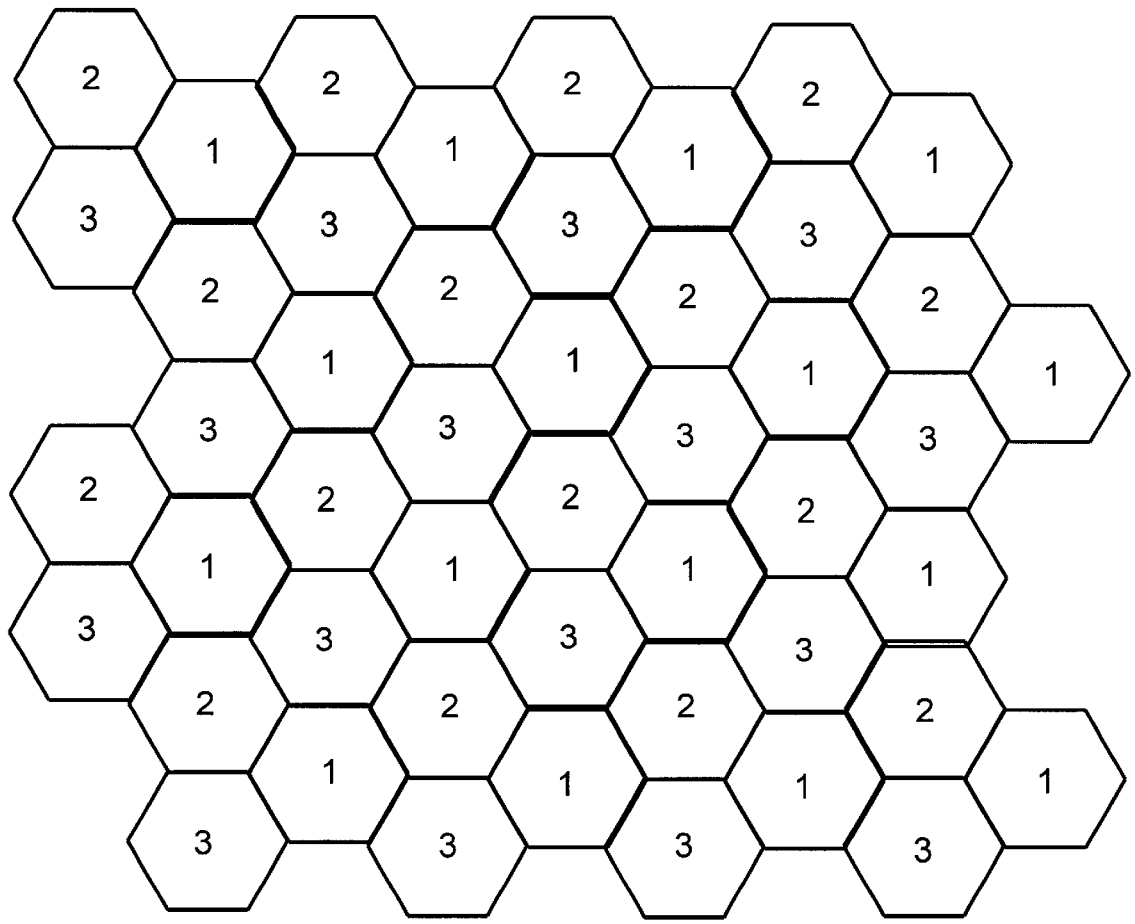
FIG. 6 shows another frequency reuse pattern.

In a first embodiment of the invention, a frequency plan is first made for the cellular network on a relatively dense frequency reuse pattern. An example of an applicable pattern is shown in FIG. 6, wherein the frequencies are divided into three classes 1, 2 and 3, and the same frequency is allocated for use in every third cell. As an extreme case it is possible even to use reuse pattern 1, wherein each cell has at its disposal all frequencies available to the system. However, since channels which are reused so frequently would cause considerable interference to each other, frequencies can not be used at the same time in all cells at maximum power. For this reason, the use of transmission power must be blocked in different cells.

Figure 7:
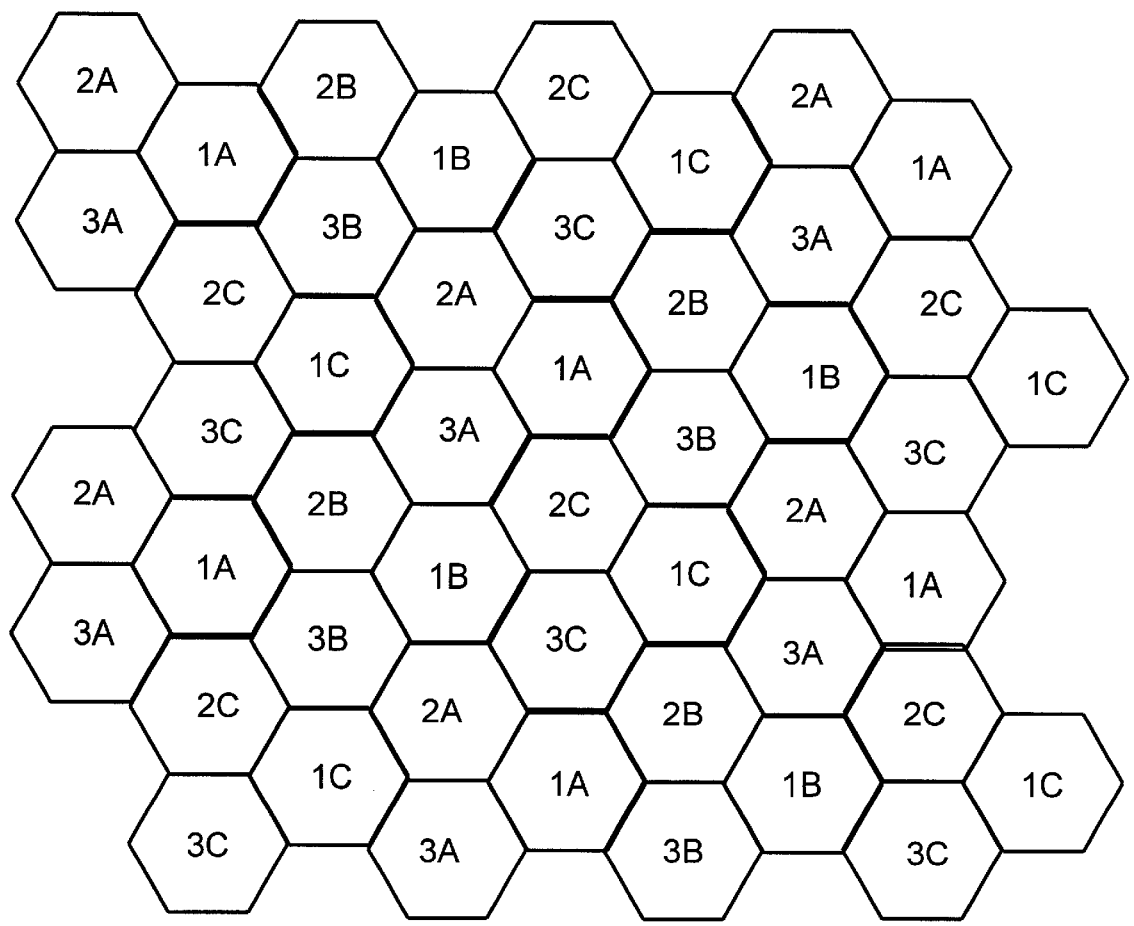
FIG. 7 shows the same frequency reuse pattern further divided in accordance with the invention.

A frequency plan made with a dense reuse pattern is divided further into sub-classes. FIG. 7 shows a design where the frequency classes 1, 2 and 3 of the plan in FIG. 6 are all divided further into three sub-classes A, B and C.

Figure 8A:
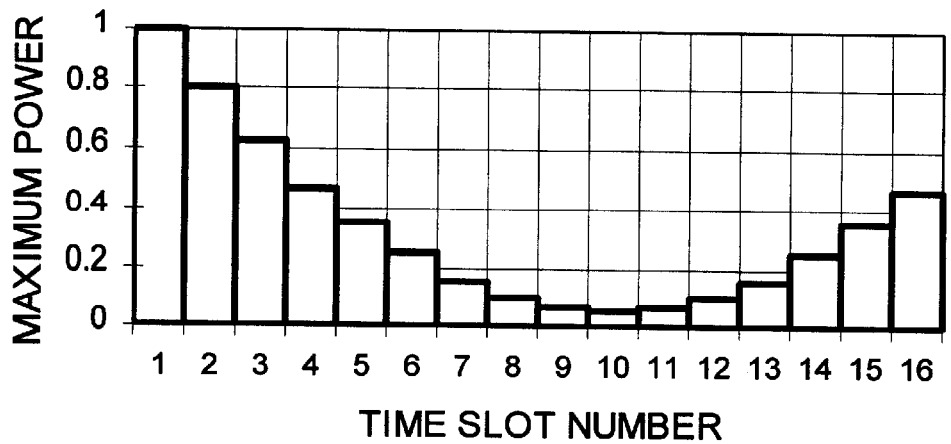
FIGS. 8A, 8B and 8C show a method of channel allocation according to a first embodiment of the invention.
Figure 8B:
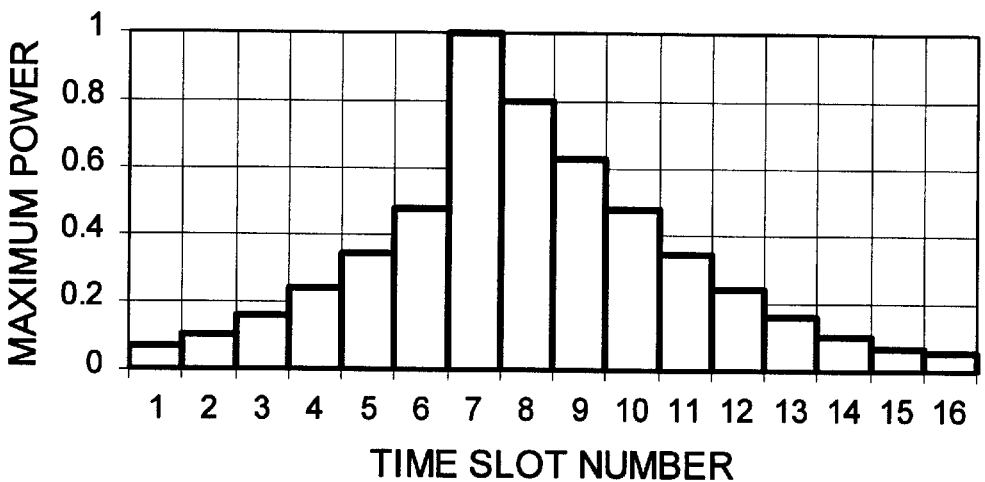
Figure 8C:
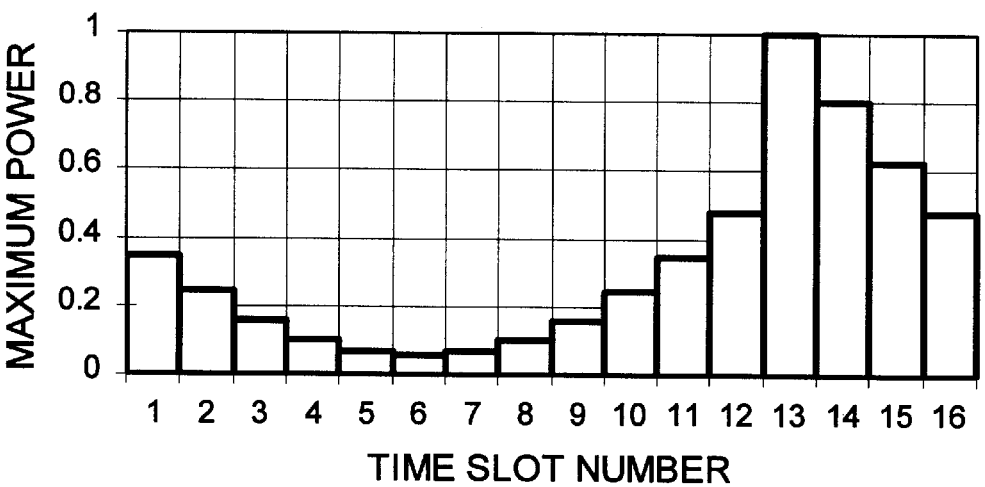

The use of power in the different classes is blocked in accordance with FIGS. 8A, 8B and 8C. FIG. 8A shows the limitations of transmission power in different time slots in the cells of sub-class A. In time slot 1, the maximum transmission power permissible in the cell can be used in the cells of sub-class A. This time slot is assigned for those connections of the cell which will suffer most fades. Permissible powers lower than the transmission power permissible in time slot 1 are determined for the other time slots.

FIGS. 8B and 8C show the maximum powers of sub-classes B and C in the different time slots. In sub-class B, use of the maximum transmission power permissible in the cell is permissible in time slot 7, while in sub-class C it is permissible in time slot 13. The transmission powers of different classes are blocked in such a way that when a high transmission power is used in some class, a relatively low transmission power will be correspondingly used in the other classes.

Figure 9A:
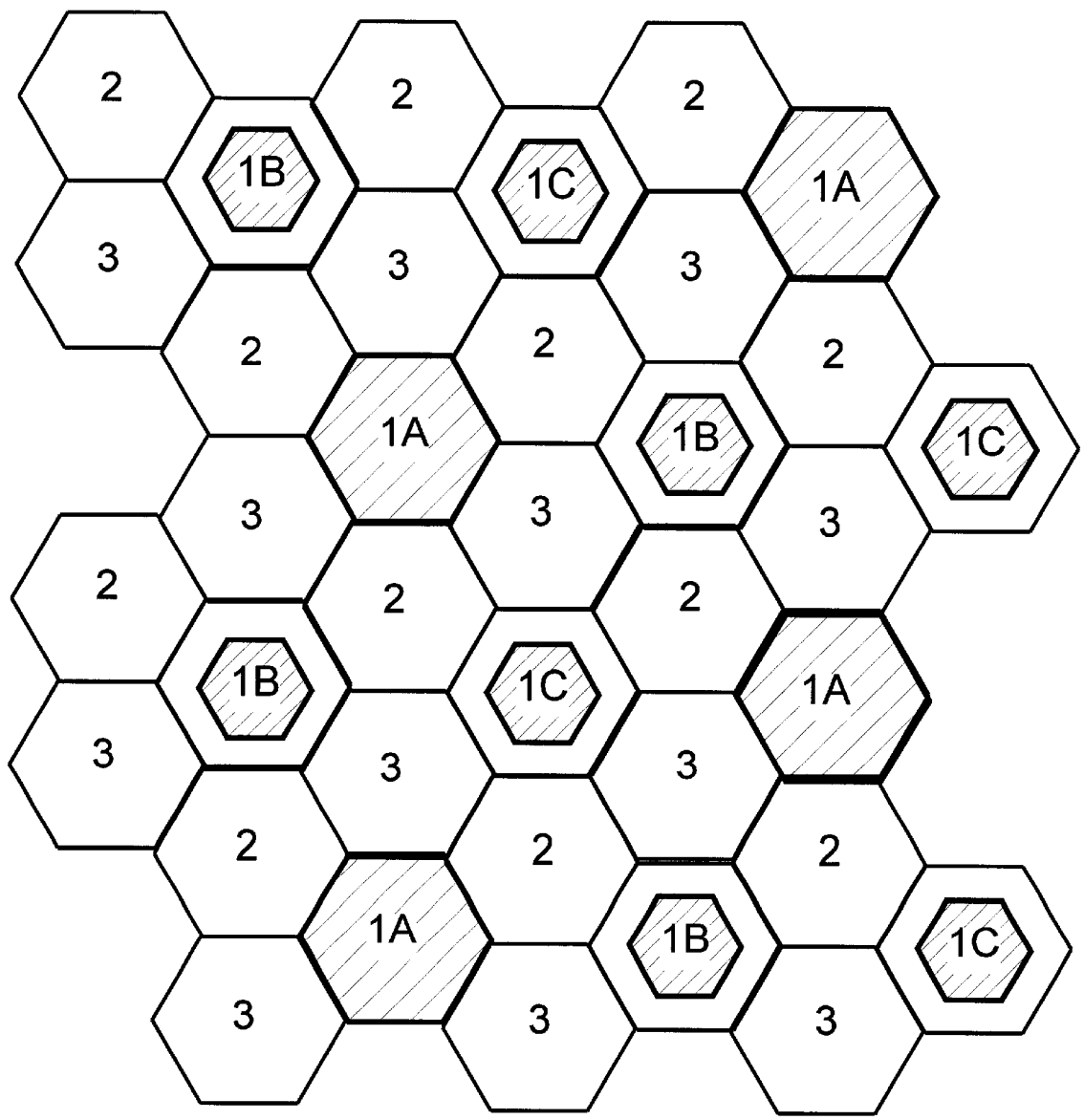
FIGS. 9A, 9B and 9C show frequency plans based on time slots according to a first embodiment of the invention.
Figure 9B:
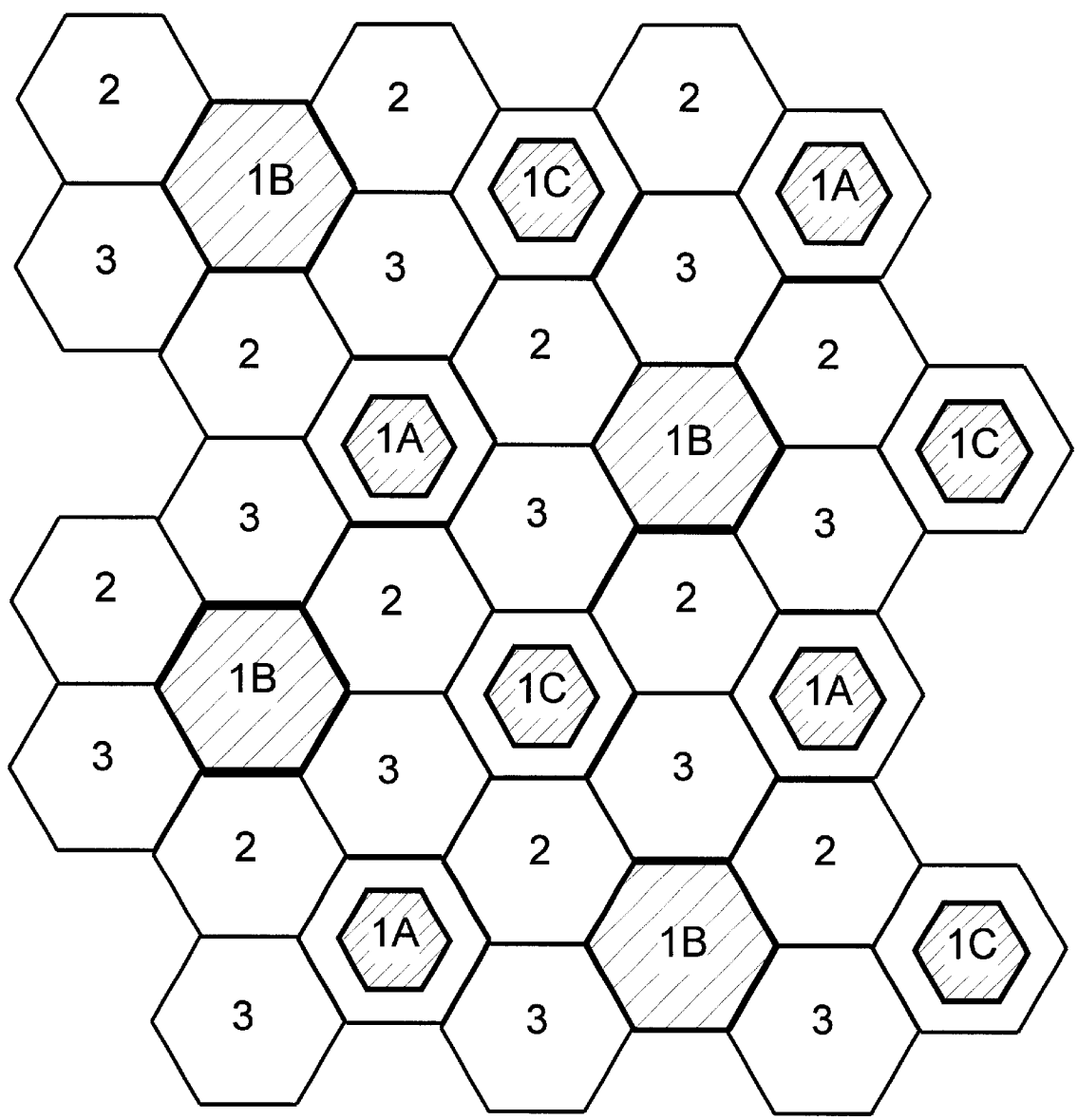
Figure 9C:
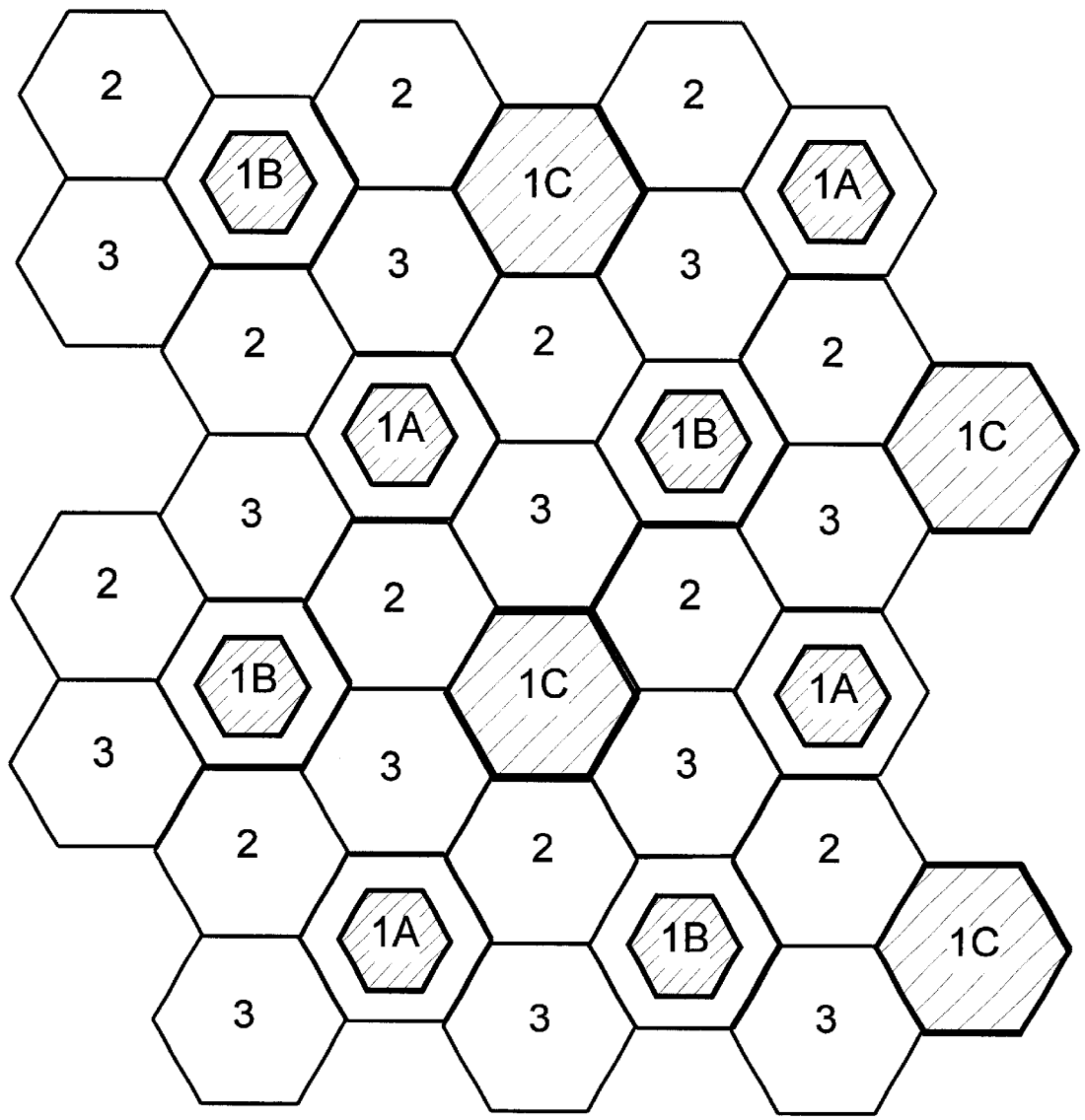

The advantage obtained by blocked use is examined in FIGS. 9A, 9B and 9C, which show the service area which can be achieved in different time slots, that is, the area in which the achieved carrier to interference ratio is sufficiently good. The figures examine service areas of cells belonging to frequency class 1 only, but service areas behave exactly in the same way in the other cell classes.

FIG. 9A shows a service area in time slot 1 of FIGS. 8A, 8B and 8C. In this, a high power is used in the cells of class A while a considerably lower power is used in the cells of classes B and C. In class A it is possible at the permissible high transmission power to serve any mobile station located in the cell area. The high transmission power of the cells of class A will cause considerable interference in the cells of other classes, where the transmission power is moreover limited. For this reason, operation is possible in these classes in those connections only where fades on the radio path between mobile station and base transceiver station is considerably less than the maximum fades used in the dimensioning of the cell. In practice, this means that in classes B and C the time slot 1 of FIGS. 8A, 8B and 8C can be used by those mobile stations only which are located within the area covered with oblique lines, which is considerably smaller than the total area of the cell. However, when using maximum power in the cells of class A, it is possible in the other classes to set up connections in an area about half the size of the total cell area.

With a reduction in the transmission power of the cells in class A the interference caused to other cells by the cells in this class will also be reduced. The spectrum thus vacated may be used in the other cells. In the case of our example, vacated spectrum is utilized by raising the transmission power of the cells in class B. In time slot 7 of FIGS. 8A, 8B and 8C, the transmission power of class B is at its maximum value and the service area obtained at the frequencies of class 1 is as shown in FIG. 9B. In this time slot the total cell area can be served in the cells of class B. On the other hand, the interference caused by the cells of class B in their environment is at its maximum, for which reason only a part of the cell area can be served in the cells of classes A and C.

FIG. 9C shows the service area during time slot 13 of FIGS. 8A, 8B and 8C. Hereby the cells of class C use the high power at which mobile stations may be served from any part of the cell. In the other classes such a lower power is hereby used with which only a part of the cell area can be served.

As a result of blocking the use of power, the interference formed around themselves by the base transceiver stations of cells will rise and fall periodically. In situations where in the cell area there is a relatively high interference level caused by a transmission in a nearby cell using the same frequency, the frequency may nevertheless be used for those connections where the fading caused by the radio channel to the signal is small. Such typical connections are the connections between base transceiver station and mobile stations located near the base transceiver station.

The connections to be set up in the cell are preferably arranged according to the transmission power required by the connection. Arranged connections are allocated from the connection needing the highest power towards those needing a lower power starting from the time slot allowing the highest transmission power and proceeding towards time slots allowing lower transmission powers.

The method according to the invention makes it possible to use the spectrum not used in a channel. If on some channel the whole transmission power allocated for the channel is not needed, the part remaining free can be made available to other nearby cells. The addition to power permissible in other base transceiver stations can be determined by analyzing the magnitude of interference caused to each other by different connections. The transmission power limitation of the cell can be changed, if the use of an increased transmission power will not cause excessive interference in other cells located in the interference area of the cell. Any change of limitation may be agreed upon through a negotiation between the cell itself and e.g. those network elements which attend to allocation of channels for those other cells estimated to be receivable in the interference area of the cell which are defined by the network management system NMS. Since a cell will typically belong to the interference area of several other cells, there are always several valid transmission power limitation conditions for each time slot of the cell and the condition allowing the lowest transmission power is of course a limiting one.

Transmission power limitations may be defined separately for each available frequency. Correspondingly, the same transmission power limitations for separate time slots may be used for all frequencies, whereby the signalling needed for negotiations becomes lesser.

In a second embodiment of the invention, connections are divided into two or more classes according to the transmission power requirement. Separate time slots are allocated to different classes. A separate frequency plan is used for each class. Hereby a very dense reuse pattern may be used for time slots where a considerably low transmission power is used. Similarly, a less dense reuse pattern must be used for time slots, where a higher transmission power is used.

Figure 10:
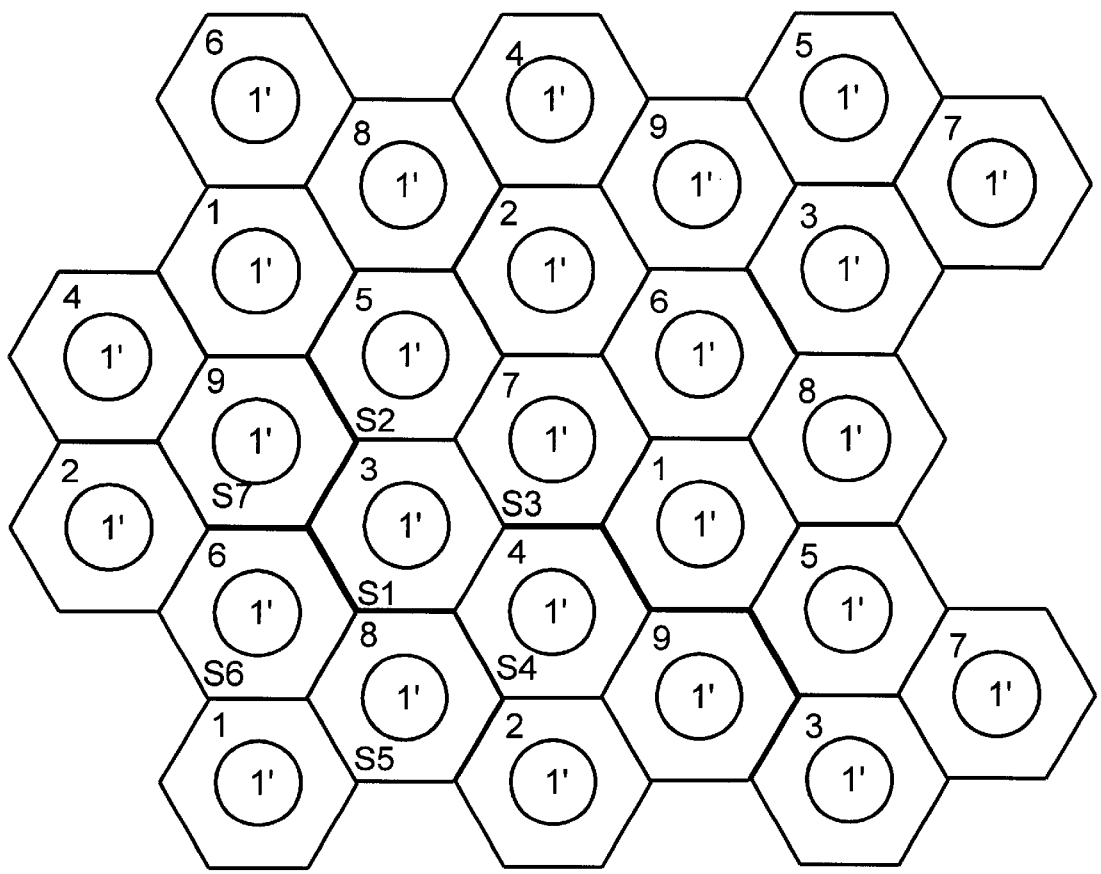
FIG. 10 shows two superimposed reuse patterns.

FIG. 10 shows a system using two frequency reuse patterns. In the shown frequency plan, a less dense frequency plan is used in a first time slot class, in which frequencies are divided into nine classes 1–9, while in a second time slot class a denser frequency plan is used, wherein all frequencies belong to the same frequency class 1'. Thus, all frequencies are used in all cells in the denser frequency plan. When using the denser frequency plan, it is possible to use a much lower transmission power than when using a less dense frequency plan. With this lower transmission power it is not possible to serve the entire cell area, but only those mobile stations which are located in the encircled area close to the base transceiver station. For this reason, servicing of mobile stations located in the peripheral cell area will require a less dense reuse pattern reusing the same frequencies in every ninth cell.

Figure 11:
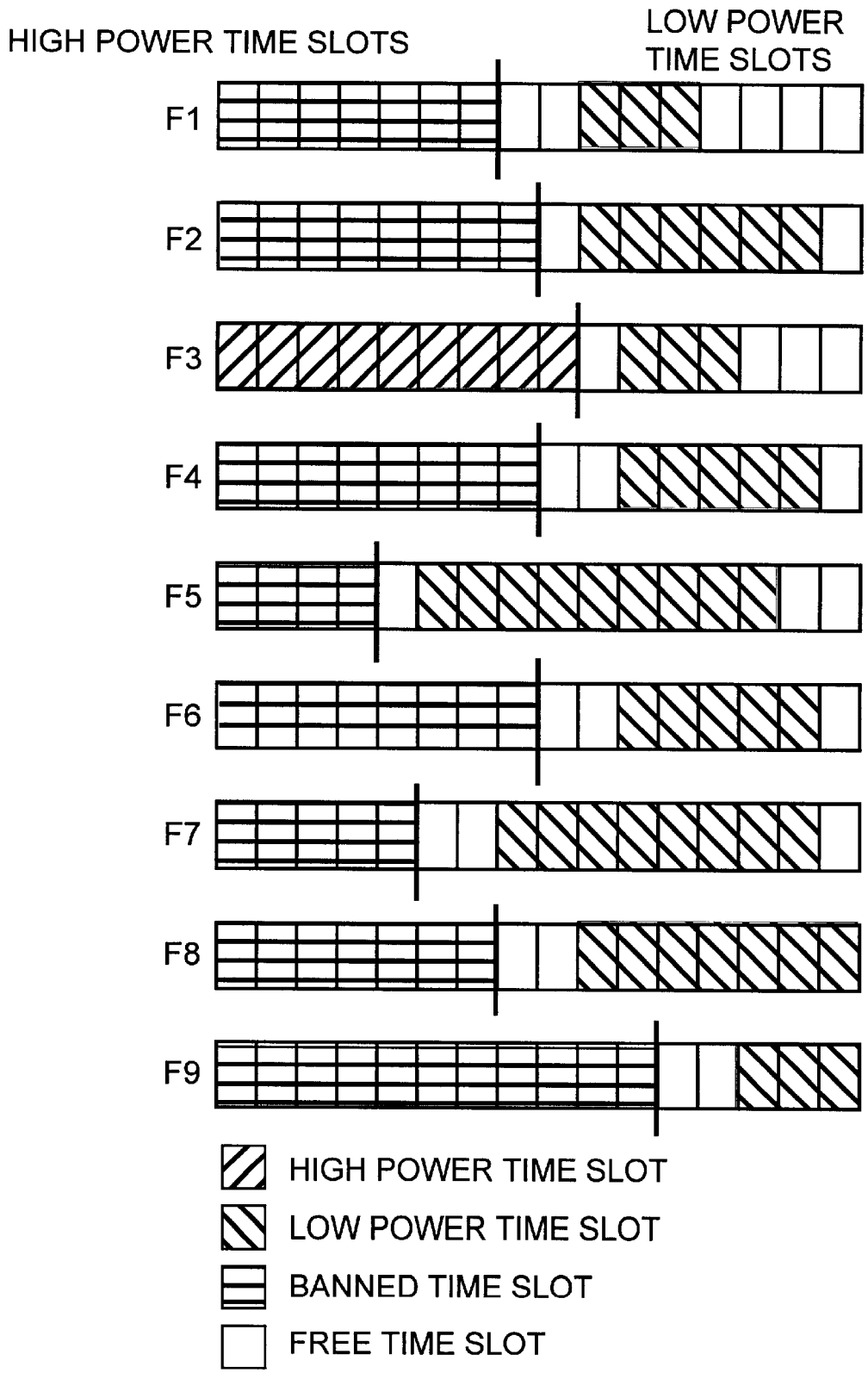
FIG. 11 shows channel allocation between different reuse patterns according to a second embodiment of the invention.

Time slots are divided by frequency into time slots of high and low power respectively. FIG. 11 shows an example of the division of time slots in one cell S1. The time slots of each frequency are divided into time slots of high and low transmission power respectively. Time slots of high transmission power are located at the beginning of the time frame at all frequencies. The frequency-based numbers of frequencies of high and low transmission power are preferably negotiated according to the topical traffic requirement. The less dense frequency reuse pattern of FIG. 10 which reuses the same frequencies in every ninth cell is applied to high power time slots. For low power time slots, the dense reuse pattern of FIG. 10 is used which reuses all frequencies in every cell (frequencies 1'). Frequency F3 is allocated for cell S1 in the figure from the less dense frequency reuse pattern comprising 9 cells.

All connections of cell S1 needing a high transmission power are directed into the 9 first time slots of frequency F3. In high power time slots it is not possible to transmit anything in the cell at other frequencies than frequency F3. If there are more connections needing a high transmission power in cell S1, an attempt is made to move the border between high and low transmission power of frequency F3. The border can be moved, if there are free time slots of frequency F3 allocated for a low power at those base transceiver stations to which the connections of cell S1 cause interference. The situation is clarified in FIGS. 12A and 12B.

Figure 12A:
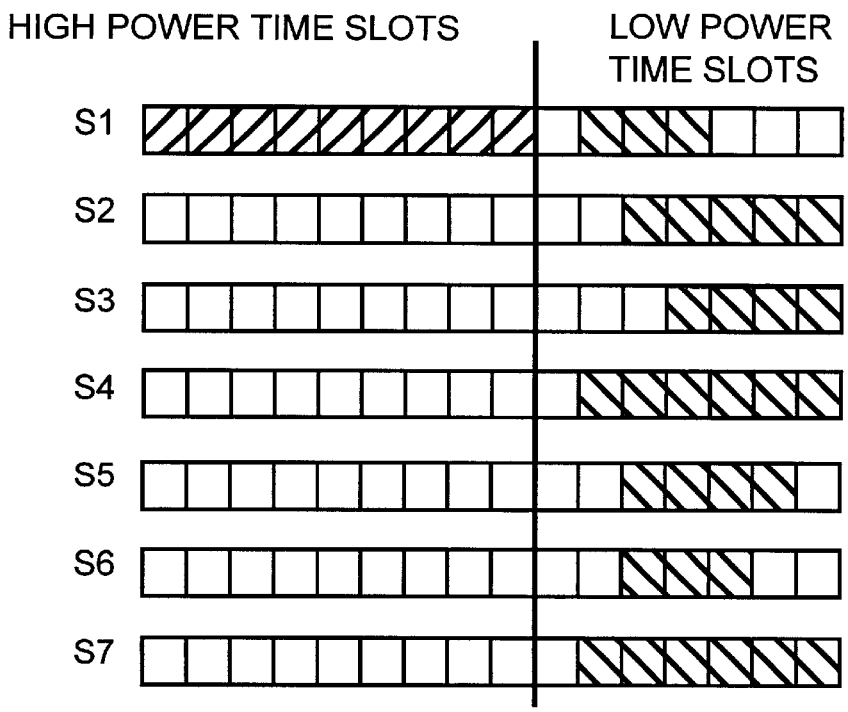
FIGS. 12A and 12B show a division of channels of one frequency between different reuse patterns in adjacent cells.

FIG. 12A shows division at moment T of time slots of frequency F3 in cell S1 and in cells S2–S7 which are defined e.g. by network management system NMS as located within interference distance. According to the FIG. 10, cells S2–S7 are neighbor cells of cell S1. According to the frequency plan, frequency F3 is used at a high transmission power in cell S1 only. At a low transmission power, the frequency may be used in all cells S1–S7. At moment T the time slots are divided so that the first nine time slots of the time frame are available to connections using a high transmission power. In other words, in time slots 1–9 a high transmission power is used in cell S1, whereas use of these time slots is banned in cells S2–S7. Time slots 10–16 are low power time slots.

In cell S1, all time slots with a high transmission power are in use. At moment T the cell receives a request for connection set-up for a connection needing a high transmission power. Since its current high transmission power resources are not sufficient for forming a new connection, it needs to move the border between high and low power time slots.

In response to the detection of the need to move the border between time slots with high and low transmission power, those network elements which attend to the allocation situation of cells defined as being in the interference area of cell S1 will check whether all cells in the interference area have free low transmission power capacity. Since free low power capacity is found in every cell S1–S7, the border can be moved forward by one time slot. After moving the border, the allocation situation of frequency F3 in the different cells is as shown in FIG. 12B.

Figure 12B:
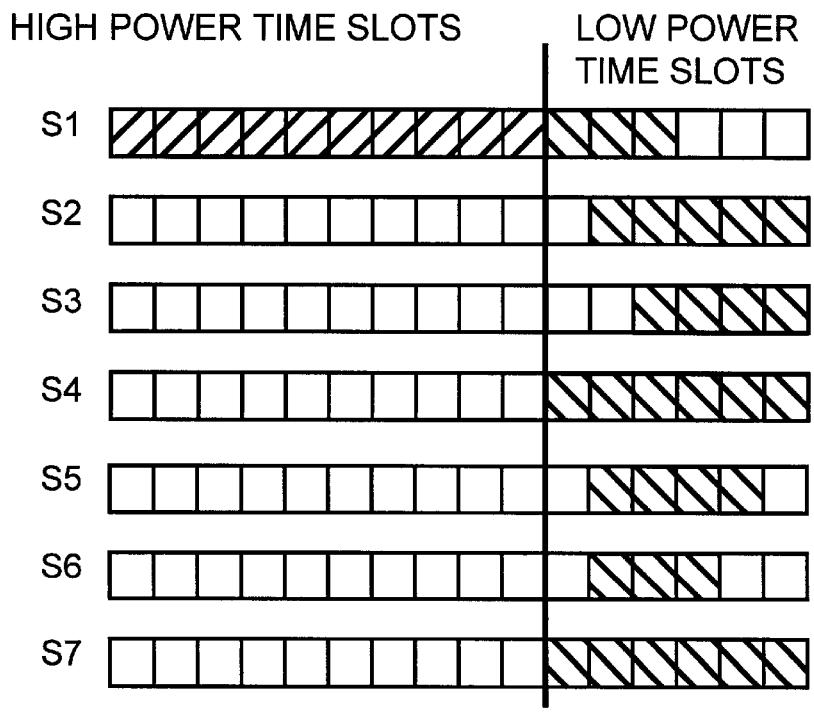
Figure 12B:
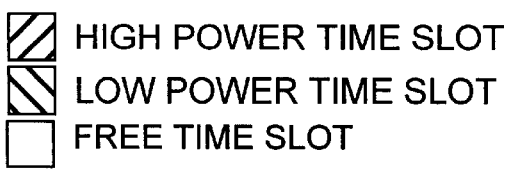

FIG. 12B shows the allocation situation of the time slots of frequency F3 in cells S1–S7 in the frequency plan shown in FIG. 10 at moment T+ΔT. From the situation shown in FIG. 12B the number of high transmission power time slots has been increased by one so that a high transmission power can now be used in cell S1 in time slots 1–10. Correspondingly, any use of time slots 1–10 is banned in the other cells S2–S7. A low transmission power may be used in all cells S1–S7 during time slots 11–16. Since the high transmission power capacity of cell S1 has been increased by one time slot, it is possible to set up the high transmission power connection originated in the cell. Time slot 10 is allocated to this connection. All other connections use the same time slots as at moment T, and FIG. 12A shows the allocation situation prevailing at that moment.

The individual cell typically belongs to the interference area of several other cells. This being the case, the individual cell is typically affected by many different divisions into time slots of different transmission power classes, all of which it must comply with. A high transmission power can be used in the cell in those time slots only which in all divisions belong to high power time slots. Correspondingly, a low transmission power can typically be used in those time slots only which belong to low transmission power time slots in all time slot divisions affecting the cell.

From the viewpoint of effective allocation it is advantageous to define separately for each frequency the time slots used by power classes corresponding to different reuse patterns. Correspondingly, it is possible to use time slot classes common to all frequencies, whereby the signalling needed for changing the classes will become lesser.

Time slots may of course be divided into high and low transmission power time slots by using some other method than the one presented in FIGS. 11, 12A and 12B. It is possible alternatively e.g. fixedly to allocate some time slots for use by high power connections and some for use by low power connections. Hereby the remaining time slots are divided dynamically according to the traffic requirement.

It is not necessary to entirely ban the use of a high transmission power frequency in other cells located within the interference distance. Use of the frequency may alternatively be permitted at a limited and typically very low power, which will not excessively interfere with the connections using a high transmission power. Connections using a very low transmission power in cells adjacent to a cell using a high transmission power are typically connections between the base transceiver station and mobile stations located close to it, and only a small part of the entire cell area can be served at a low transmission power.

In a third embodiment of the invention, the first and second embodiments presented above are combined. The time slots are hereby first divided roughly into two or more classes. Inside the classes the connections are arranged in accordance with the first embodiment of the invention in an order of magnitude according to the transmission power and transmissions are blocked so that connections using a high transmission power inside the class will not transmit simultaneously.

When studying channel allocation in a system where several data of different types is transferred, the transfer requirements of the different types of data can be used as an aid in channel allocation. Since e.g. video data makes rather strict demands both on delay and on errorless transfer, video data may be given top priority when dividing high transmission power time slots. Speech data makes strict demands on delay, but it tolerates a relatively high number of transfer errors. Thus a slightly lower carrier to interference ratio than for video data is sufficient for it. There is no significant limitation for delay in data transfer, but on the other hand, data transfer tolerates no transfer errors at all. Errorless transfer is achieved not only by using a high CIR value but also by using powerful channel coding, a long interleaving period and retransmission of faulty frames, which will regrettably cause additional delay in the information transfer. Since data transfer does not set any significant limitations on delay, channel coding may be used to give it the lowest CIR requirement and the lowest priority when allocating high transmission power time slots. A low transmission power may e.g. always be allocated to data transmissions unless high power time slots are available. Hereby it is not necessary to change the limitations of transmission power based on the time slots of cells when a data connection gets a poor CIR value due e.g. to a limitation of transmission power on the channel, but the connection may be instructed to use a time slot with a low transmission power and correspondingly more powerful channel coding, a longer interleaving period and retransmissions. It is especially important to take into account the different demands of traffic types on the information transfer because data transfer is the very place where traffic densities and the required capacity are high, whereby a considerable capacity advantage is achieved by making the reuse pattern denser.

Interference of different kinds is experienced by up-link connections, that is, connections between mobile stations and the base transceiver station from the mobile station to the base transceiver station, and by down-link connections from the base transceiver station to the mobile station. For this reason, the time slot allocations according to the required transmission power presented above are preferably different in the up-link and down-link directions. The mechanisms according to the invention can be used both in FDD arrangements (Frequency Division Duplex, an arrangement wherein up-link and down-link connections use different frequencies) and in TDD arrangements (Time Division Duplex, an arrangement wherein up-link and down-link connections transmit at different times). Methods according to the invention may also be applied in systems wherein the time division is done asymmetrically so that a different number of time slots is available in different directions.

The frequency reuse patterns used in the examples presented above are only examples of a feasible frequency reuse pattern, and the invention is not limited to use of these. The only thing essential for the invention is that time division is used in the channel structure. The invention can thus be applied also e.g. in systems where the channel is defined e.g. by a hash code s implementing CDM division and by time slot TS or by hash code s, frequency F and time slot TS. When using frequency and time slot hopping, the limitations of transmission power for different time slots can preferably be set to hop along with the frequency or time slot hopping pattern.

It is obvious that embodiments of the invention are not limited to the embodiments presented in the foregoing, but they may vary in accordance with the scope of the appended claims.

What is claimed is:

1. A method for channel allocation in a mobile communications system having a time frame structure and including mobile stations, several base transceiver stations and cells defined by their radio coverage areas, whereby a set of channels is allocated for each cell, a set of carrier wave frequencies is allocated for use by each cell, a connection can be set up between a mobile station in the cell and a base transceiver station of the cell using a channel which uses some carrier wave frequency allocated for use by the cell and which is defined at least by a time slot in the time frame structure, and wherein transmission powers used by mobile stations and base transceiver stations can be adjusted, a maximum transmission power permissible on a channel being predetermined, said method comprising:

allocating the carrier wave frequencies with a relatively dense reuse pattern;

dividing cells using the same carrier wave frequencies into classes;

in each class, allocating channels to cells belonging to the same class so that connections using the same channel simultaneously in different cells of the same class at the maximum transmission power would cause mutual interference to each other exceeding acceptable interference; and subsequently in each class, adjusting transmission powers of cells belonging to the same class and using the same channel on a time slot basis, so that, concerning each time slot, a transmission at the maximum transmission power is allowed only in one cell, and adjusting transmission powers of for each cell belonging to the same class to have an individual time slot basis transmission power limitation.

2. The method as defined in claim 1, wherein:

the connections of the cell are arranged according to the required transmission power from the highest to the lowest; and time slots are allocated to the connections arranged according to the transmission power in an order of magnitude of the permissible transmission powers of the time slots.

3. The method as defined in claim 1, wherein the channel is defined by the time slot of the time frame and by frequency.

4. The method as defined in claim 1, wherein the channel is defined by the time slot of the time frame and by a hash code.

5. The method as defined in claim 1, wherein the channel is defined by the time slot of the time frame, frequency, and by a hash code.

6. The method as defined in claim 1, wherein the transmission power limitations are changed dynamically according to the network load situation.

7. The method as defined in claim 1, wherein the same transmission power limitation is established for the time slot at all carrier wave frequencies.

8. The method as defined in claim 1, wherein a different transmission power limitation is established for the time slot at different carrier wave frequencies of the cell.

9. The method as defined in claim 1, wherein the transmission power limitations of the time slots are independent of each other in the direction from mobile station to base transceiver station and in the direction from base transceiver station to mobile station.

10. The method as defined in claim 1 in a system wherein an information signal to be transferred between a mobile station and a base transceiver station is processed to make the information signal better tolerate transfer errors on the radio path, whereby different requirements on the signal transmission power are achieved with different processing methods, wherein:

the transmission power required by the connection is reduced by beginning to use a processing method achieving a tolerance of transfer errors on the radio path which is better than the original tolerance; and the signal having a better tolerance of transfer errors on the radio path is placed in a time slot, wherein the maximum transmission power is lower than the transmission power required by a signal processed with the original processing method.

11. The method as defined in claim 10, wherein, in addition, several information signals with different tolerances of transfer errors are transferred, wherein the signals are allocated in time slots according to their tolerance of transfer errors, so that a lower tolerance of transfer errors corresponds to a higher transmission power permitted in the time slot.

12. A method for channel allocation in a mobile communications system with a time frame structure and including mobile stations, several base transceiver stations, and cells defined by their radio coverage areas, whereby a set of channels is allocated to each cell, a set of carrier wave frequencies is allocated for use by each cell along with channels using the set of carrier wave frequencies according to a certain channel reuse pattern, a connection can be set up between a mobile station in the cell and the base transceiver station of the cell by using a channel using some carrier wave frequency allocated for use by the cell, which channel is defined by at least a time slot in the time frame, and wherein the transmission powers used by mobile stations and base transceiver stations can be adjusted, said method comprising:

dividing transmission powers into at least two transmission power classes, wherein each class includes cells which use the same carrier wave frequency and wherein a common transmission power limitation for a class and maximum transmission power permissible in the class are predetermined:

dividing time slots between the different transmission power classes;

using different channel reuse patterns in the different time slots dependent on the transmission power class used in the time slots;

instructing connections to use the time slots of the transmission power class having the transmission power required for the connection; and inside transmission power classes in different cells, establishing transmission power limitations stricter than the common transmission power limitation of the class at least for some time slots, in such a way that use of the maximum transmission power permissible in the class is not permitted simultaneously in those cells where connections using the same time slot cause most interference to each other when using the maximum transmission power permissible in the class.

13. The method as defined in claim 12, wherein:

dividing connections into transmission power classes formed according to the required transmission powers; and instructing the connections divided into each transmission power class to use the time slots of the transmission power class in question.

14. The method as defined in claim 12, wherein the transmission power limitations of time slots are independent of each other in the direction from mobile station to base transceiver station and in the direction from base transceiver station to mobile station.

15. The method as defined in claim 12, wherein the channel is defined by the time slot of the time frame and by frequency.

16. The method as defined in claim 12, wherein the channel is defined by the time slot of the time frame and by a hash code.

17. The method as defined in claim 12, wherein the channel is defined by the time slot of the time frame, frequency, and by a hash code.

18. The method as defined in claim 12, wherein the transmission power limitations are changed dynamically according to the network load situation.

19. The method as defined in claim 12, wherein the time slots are divided between different transmission power classes in the same manner at all carrier wave frequencies.

20. The method as defined in claim 12, wherein the time slots are divided between different transmission power classes in different ways at different carrier wave frequencies.

21. The method as defined in claim 12 in a system wherein;

an information signal to be transferred between a mobile station and a base transceiver station is processed to make the information signal better tolerate transfer errors on the radio path, whereby different requirements on the transmission power of the signal are achieved with different processing methods;

the transmission power required by the connection is reduced by beginning to use a processing method achieving a tolerance of transfer errors on the radio path which is better than the original tolerance; and the signal having a better tolerance of transfer errors on the radio path is placed in a time slot wherein the maximum transmission power permissible in a class is lower than the transmission power required by a signal processed with the original processing method.

22. The method as defined in claim 21, wherein, in addition, several such information signals are transferred which have different tolerances of transfer errors, wherein the signals are placed in time slots according to their tolerance of transfer errors in such a way that a lower tolerance of transfer errors corresponds to a higher transmission power permitted in the time slot.

* * * * *